Patented Oct. 31, 1939

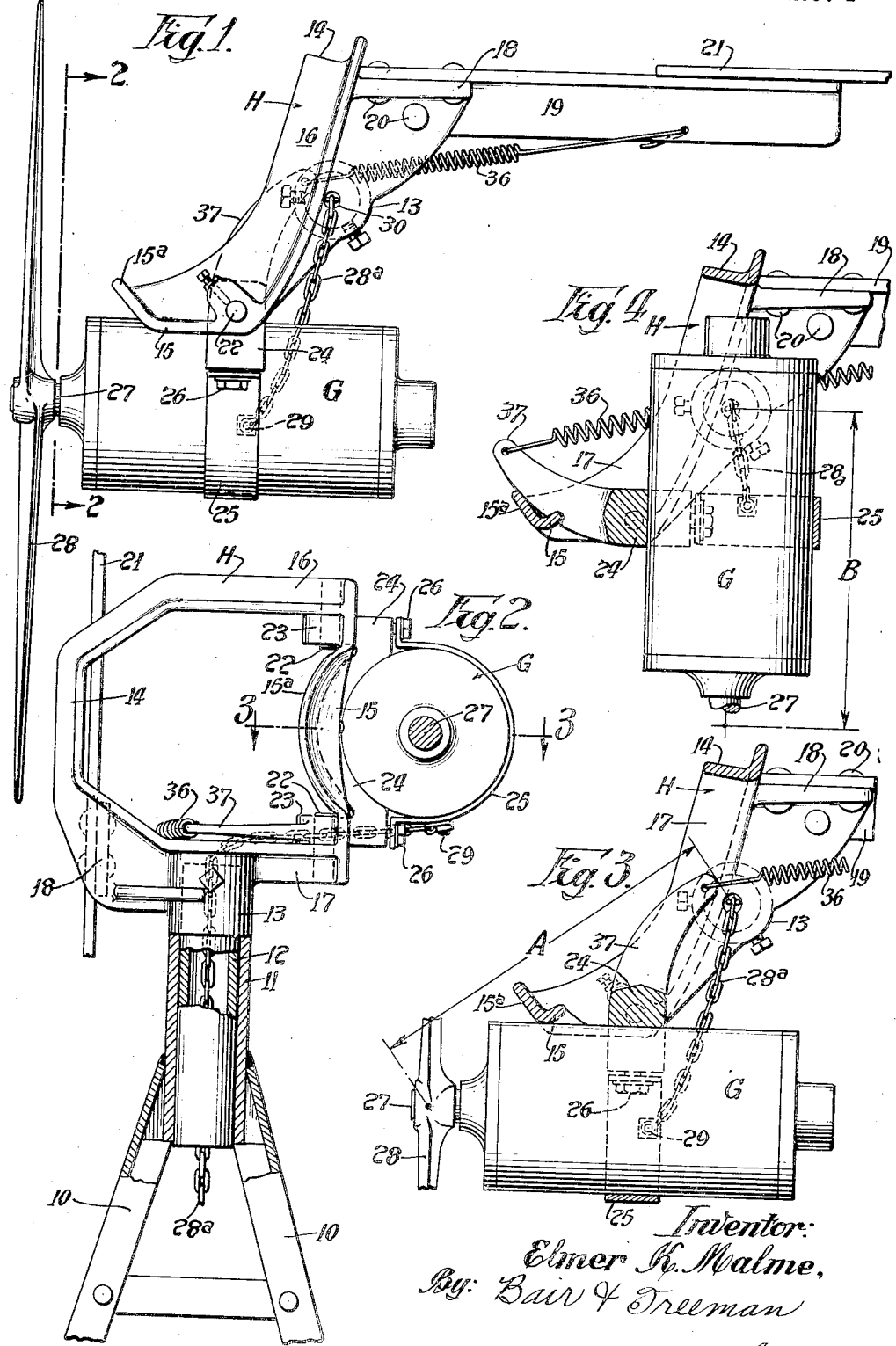
Oct. 31, 1939. E. K. MALME 2,178,047
WIND DRIVEN GENERATOR STRUCTURE
Filed Feb. 21, 1938 2 Sheets-Sheet 1
Inventor:
Elmer K. Malme,
By: Bair & Freeman
Attorneys.

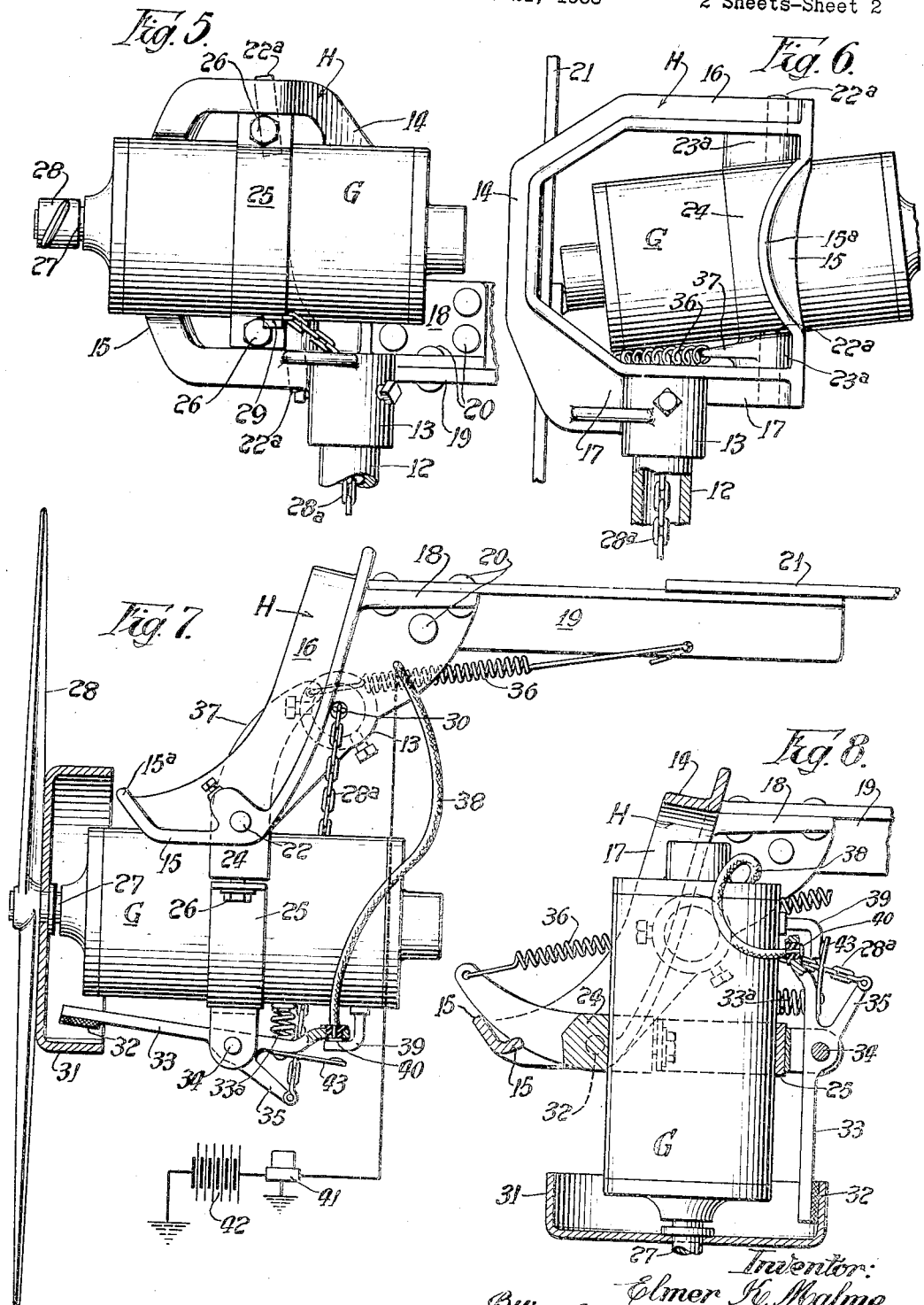

2,178,047

UNITED STATES PATENT OFFICE 2,178,047

WIND DRIVEN GENERATOR STRUCTURE

Elmer K. Malme, Chicago, Ill., assignor of one-third to Cecil L. Parris, and one-third to William G. Dunn, both of Clarinda, Iowa Application February 21, 1938, Serial No. 191,701

29 Claims. (Cl. 290—44)

An object of my invention is to provide a wind-driven generator structure of simple, durable and inexpensive construction.

A further object is to provide a wind-driven generator structure in which the generator is pivoted on a vertical axis so that it can be swung out of the wind by the pressure thereof against the propeller mounted on the generator shaft when the wind pressure increases above a predetermined degree.

Another object is to provide a wind driven generator in which the generator is pivoted so that it can swing out of the wind and its pivotal axis is so related to the vane of the structure that the propeller will be swung out of the wind instead of the vane being swung toward the propeller, due to the gyroscopic action of the propeller during rotation, tending to retain the propeller in its plane of rotation.

A further object is to provide a manual throw-out means for my wind driven generator which is operable to swing the generator on its vertical axis when the manual throw-out means is pulled downwardly relative to the head of the generator structure.

Still a further object is to provide a wind driven generator structure in which a head member is rotatably mounted on a vertical axis on a tower or the like, a vane being provided for maintaining the head in a desired direction relative to the wind and a generator being mounted on the head member and having a propeller which is at substantially right angles to the direction of the wind. The vane is offset relative to the propeller to effect a more powerful action of the wind on the vane to keep the vane substantially parallel to the wind when the generator turns on a vertical axis due to the pressure of the wind against the propeller on the generator.

Another object is to provide the vertical axis on which the generator swings inclined at a slight angle so that when the generator swings out of the wind and the plane of the propeller thereby approaches closer to the tower on which the structure is mounted, the plane of the propeller will be tipped relative to the vertical so that the lower sweep of the propeller blade will tip away from the tower and thus avoid striking the tower.

Still another object is to provide a manual throw-out for the propeller which is operable, whenever it is desirable to discontinue operation of the wind driven generator structure, to apply a frictional brake to the propeller and thereby stop its rotation to reduce its gyroscopic action and thus permit immediate movement of the propeller to the desired position.

Still a further object is to provide in connection with the brake, means to disconnect a battery charging wire from the generator and to ground the generator so long as the brake is applied.

With these and other objects in view, my wind-driven generator consists of an arrangement and combination of parts, whereby the objects contemplated are attained, as hereinafter more fully set forth, pointed out in my claims, and illustrated in the accompanying drawings, in which:

Figure 1 is a plan view of a wind-driven generator structure embodying my invention.

Figure 2 is a front elevational view thereof with the generator shaft in section on the line 2—2 of Figure 1 and with portions of the tower on which the generator structure is mounted shown in section.

Figure 3 is a sectional view on the line 3—3 of Figure 2 showing the relation of the parts when the generator is in normal position.

Figure 4 is a similar sectional view showing the generator in a swung back position as assumed due to manual throw-out operation or as a result of extreme excess wind pressure.

Figure 5 is a side elevation of my generator structure showing a slight modification with respect to the vertical pivot on which the generator is mounted, the pivot being tipped at a slight angle.

Figure 6 is a front view similar to Figure 2 showing the generator of Figure 5 in a thrown-back position to illustrate how, due to the inclination of the pivot in Figure 5, the outer end of the axis of the generator is tipped upwardly and thereby the lower sweep of the propeller blade is spaced farther from the tower than when the axis of the generator is vertical, as in Figures 1 and 4.

Figure 7 is a plan view of a further modified form of the invention showing the addition of a brake for the propeller and circuit control means for the generator; and Figure 8 is a sectional view similar to Figure 4 showing the modification of Figure 7 in manually thrown-out position.

On the accompanying drawings I have used the reference numeral 10 to indicate generally the frame members of a supporting tower for my generator structure. The frame members 10 support a sleeve 11 in which is rotatably mounted a sleeve 12. A hub 13 of a head member H has the upper end of the sleeve 12 secured therein. The head member H viewed from the front is somewhat rectangular in shape having a pair of sides 14 and 15, a top 16 and a bottom 17.

A wing 18 extends rearwardly from the side 14 of the head member H and an angle bar 19 is secured thereto as by rivets 20. A vane 21 is secured to the angle bar 19 so that the vane is off center relative to the sleeve 12 on which the head member H is pivotally mounted. The vane 21 tends to keep the head member H in a desired position relative to the wind.

The top 16 and bottom 17 of the head member H are provided with pivot pins 22. The pins 22 have pivoted on them, bosses 23 of a generator yoke 24. A generator G is seated in the yoke 24 and secured therein by a clamp band 25 and cap screws 26. The shaft of the generator is indicated at 27. A propeller 28 is mounted on the shaft for driving the generator by rotation of the propeller caused by wind pressure thereagainst. The axis of the pivots 22, it will be noted, is off center relative to the sleeve 12 and on the opposite side thereof from the vane 21.

For manually throwing out the generator G, I provide a chain 28a connected to the clamp band 25 at 29. The chain 28a bends through an opening 30 in the bottom 17 of the head member H and passes downwardly through the sleeve 12 to a convenient point where it may be manipulated.

Referring to Figure 3, a dimension line A is shown. This line indicates the distance between the propeller 28 and the axis of the tower 10. When the generator is swung back, this distance decreases to the dimension line indicated at B in Figure 4. This brings the lower sweep of the propeller closer to the tower 10 and where thin bladed propellers are used, there is danger of them bending back and striking the tower. To overcome this difficulty I have provided in the modified form shown in Figures 5 and 6, pivot pins 22a which are so mounted that the pivotal axis of the generator is inclined forwardly at the upper end. This results in inclining the axis of the generator upwardly and outwardly when the generator is thrown out as shown in Figure 6, thus tipping the lower sweep of the blade away from the tower and maintaining a desired clearance between the blade and the tower in this manner.

In connection with wind driven generators, I have found it desirable when manually throwing out the generator to apply a brake to the propeller to slow down and stop its rotation and thereby reduce its centrifugal action so that it can be swung out without resulting in the vane folding up on the propeller and the propeller remaining faced toward the wind and so that it will not rotate after being thrown out when the wind thereafter strikes it. I accomplish this in Figures 7 and 8 by placing a brake drum 31 on the generator shaft and providing a brake shoe 32 for cooperation therewith. The brake shoe 32 is mounted on an arm 33 pivoted as at 34 to the clamp band 25. The throw-out chain 28 is connected with an arm 35 extending from the arm 33 whereby when the chain is pulled upon the initial movement will result in the brake shoe 32 contacting with the brake drum 31. Thereafter the brake is applied and then the generator swung out of the wind on its axis 22 against the bias of a spring 36 provided to normally retain the propeller faced toward the wind.

The spring 36 is connected to an arm 37 of the yoke 24 in order to normally keep the propeller facing the wind but permit it to be swung out of the wind as a result of excessive wind pressure thereagainst.

A battery charging wire 38 is illustrated in Figure 7 as connected with a terminal 39 of the generator G. This wire is at times disconnected from the terminal by providing a contact 40 for the wire carried by the arm 33 so that whenever the generator is manually thrown out, the battery charging wire is thus disconnected from the terminal 39. Thus, after the brake 32 is applied, if the cut-out 41 for the generator system is stuck, it will not result in current flowing back to the generator and burn it out due to it being held in stopped position by the brake. When the brake is not used as in Figures 1 to 6, the generator acts as a motor, thus preventing such burning out, but resulting in running down the battery 42 which is charged by the wire 38.

Another precaution that must be taken is to ground the generator terminal 39 when the wire 38 is disconnected therefrom to avoid excessive internal currents in the generator windings after the brake 32 has been applied and during the time that the propeller 28 comes to a stop. This is accomplished by providing a leaf spring 43 mounted on the arm 33 which contacts with the terminal 39 to thus ground it immediately after the battery charging wire has been disconnected from the terminal 39. The grounded position is illustrated in Figure 8.

*Practical operation*

In the operation of my wind driven generator, the spring 36 tends to retain the generator G against a flange 15a of the side 15 of the head frame H. The axis of the generator is thereby substantially parallel to the vane 21. Whenever excessive wind pressure strikes the propeller 28 it will overcome the tension of the spring 36 and swing the propeller and generator out of the wind in proportion to the degree of excessive wind pressure.

On the other hand the generator may be swung out of the wind manually by pulling downwardly on the chain 28a. It is intended of course that the vane 21 will remain in the proper direction as determined by the direction of the wind and that the generator G will swing out of the wind upon excessive wind pressure against the propeller. However, due to the gyroscopic action of the propeller, I have found it will remain in the same plane and rigidly face the wind while the vane will swing around toward the propeller if the plane of the vane is on the axis of the tower.

I have found that offsetting the axis of rotation of the generator G from the axis of the tower 10 and then offsetting the plane of the vane 21 from the axis of the tower 10, but on the opposite side of the generator axis, produces a better action of the generator in its self-governing capacity than when the generator axis and supporting tower both fall in the plane of the vane 21. This is probably due to the tendency for the vane to be forced out of the wind by the side draft occasioned by the wind against the propeller 28, the side draft being counteracted by arranging the propeller on the opposite side of the tower axis from the vane. Mere offsetting of the vane itself also produces these desirable results to some extent.

With the plane of the vane offset as disclosed, it more effectively resists pivotal movement of the generator head relative to the supporting tower when the propeller is swung sidewise due to excessive wind pressure thereagainst and the effect of such resistance is increased in proportion to air increase in the wind pressure.

Offsetting of the propeller axis relative to the vertical axis of pivotal movement of the frame also permits the propeller to be mounted closer to the supporting tower for the structure.

The inclination of the generator pivotal axis as shown in Figures 5 and 6 accomplishes a very desirable result in keeping the propeller from approaching the tower when the generator is swung out of the wind. The mechanism illustrated in Figures 7 and 8, although not absolutely necessary to satisfactory operation, serves to improve the operation of a wind-driven generator of the general type disclosed.

Some changes may be made in the construction and arrangement of the parts of my structure without, however, departing from the real spirit and purpose of my invention, and it is my intention to cover by my claims, any modified forms of structure or use of mechanical equivalents which may be reasonably included within their scope.

I claim as my invention:

1. In a wind driven generator structure, a frame pivotally mounted on a vertical axis, a vane for maintaining said frame in a desired position relative to the direction of the wind, a generator pivotally mounted on a vertical axis on said frame, means biasing said generator to remain with its axis of rotation substantially parallel to the plane of said vane, a generator shaft, a propeller on said shaft for rotating it and for swinging the generator out of the wind against such biasing force when the wind pressure against the propeller increases above a predetermined maximum, the axis of said generator being on one side of the vertical pivotal axis of said frame and the plane of said vane being on the opposite side thereof.

2. In a wind driven generator structure, a support, a frame member pivotally mounted on said support on a vertical axis and a generator pivotally mounted on said frame member on a second axis spaced from said first axis, and a vane secured to the frame in a vertical plane not intersected by either of said axes.

3. In a wind driven generator structure, a support, a frame member pivotally mounted on said support on a vertical axis and a generator pivotally mounted on said frame member on a second vertical axis spaced from said first axis.

4. In a wind driven generator structure, a support, a frame member pivotally mounted on said support on a first vertical axis and a generator pivoted on said frame member on a second vertical axis spaced from said first vertical axis, said generator having a horizontal shaft spaced in non-intersecting relationship with the said second vertical axis.

5. In a wind driven generator structure, a support, a frame member pivotally mounted on said support on a first vertical axis, a generator pivoted on said frame member on a second vertical axis spaced from said first vertical axis, said generator having a horizontal shaft spaced in non-intersecting relationship with the said second vertical axis, and vertically sliding means operatively connected to said generator for moving it about said second vertical axis.

6. In a wind driven generator structure, a support, a frame member pivotally mounted on said support on a vertical axis and a generator pivotally mounted on said frame member on a second axis, the upper end of said second vertical axis being in advance of the lower end thereof and the axis of said generator being spaced horizontally from said first vertical axis, a propeller on said generator, a vane secured to said frame in a vertical plane and means constraining said generator axis to remain substantially parallel to said vane whereby wind pressure against the propeller will swing said generator about said second axis and tip the lower end of the propeller outwardly.

7. In a wind driven generator structure, a support, a frame member pivotally mounted on said support on a vertical axis and a generator pivotally mounted on said frame member on a second axis, said second axis being inclined at a slight angle from the vertical, the axis of said generator being spaced horizontally from said first vertical axis, a propeller on said generator, a vane secured to said frame in a vertical plane and means constraining said generator axis to remain substantially parallel to said vane whereby wind pressure against the propeller will swing said generator about said inclined axis, the angularity of said second axis effecting tipping of said propeller out of the vertical plane.

8. In a wind driven generator structure, a frame pivotally mounted on a vertical axis, a vane for maintaining said frame in a desired position relative to the direction of the wind, a generator pivotally mounted on an axis on said frame inclined from the vertical, means biasing said generator to remain with its axis of rotation substantially parallel to the plane of said vane, a generator shaft, a propeller on said shaft for rotating it and for swinging the generator out of the wind against such biasing force when the wind pressure against the propeller increases above a predetermined maximum, the axis of said generator being on one side of the pivotal mounting of said generator, said vertical axis being inclined in a plane parallel to the plane of said vane.

9. In a wind driven generator structure, a frame, a generator pivotally mounted on an axis on said frame, means biasing said generator to remain with its axis of rotation substantially parallel to the direction of the wind, a generator shaft, a propeller on said shaft for rotating it and for swinging the generator out of the wind against such biasing force when the wind pressure against the propeller increases above a predetermined maximum, the axis of said generator being on one side of the pivotal mounting of said generator, said pivotal mounting being inclined in a plane parallel to the plane of said vane.

10. In a wind driven generator structure, a support, a generator pivotally mounted thereon, means biasing said generator to remain with its axis substantially parallel to the direction of the wind, a generator shaft, a propeller on said shaft for rotating it, manually operable means for swinging said generator out of the wind in opposition to said biasing means, said generator having a terminal and means for grounding said terminal when said manually operable means is operated.

11. In a wind driven generator structure, a support, a generator pivotally mounted thereon, means biasing said generator to remain with its axis substantially parallel to the direction of the wind, a generator shaft, a propeller on said shaft for rotating it, manually operable means for swinging said generator out of the wind in opposition to said biasing means, said generator having a terminal, a battery charging wire normally connected therewith and means for disconnecting said battery charging wire from said terminal when said manually operable means is operated.

12. In a wind driven generator structure, a support, a generator pivotally mounted thereon, means biasing said generator to remain with its axis substantially parallel to the direction of the wind, a generator shaft, a propeller on said shaft for rotating it, manually operable means for swinging said generator out of the wind in opposition to said biasing means, said generator having a terminal, a battery charging wire normally connected therewith and means for disconnecting said battery charging wire from said terminal when said manually operable means is operated and for grounding said terminal.

13. In a wind driven generator structure, a support, a generator pivotally mounted thereon, means biasing said generator to remain with its axis substantially parallel to the direction of the wind, a generator shaft, a propeller on said shaft for rotating it, manually operable means for swinging said generator out of the wind in opposition to said biasing means, a brake for said propeller, said generator having a terminal and means for grounding said terminal when said manually operable means is operated, and for simultaneously therewith applying said brake.

14. In a wind driven generator structure, a support, a generator pivotally mounted thereon, means biasing said generator to remain with its axis substantially parallel to the direction of the wind, a generator shaft, a propeller on said shaft for rotating it, manually operable means for swinging said generator out of the wind in opposition to said biasing means, a brake for said propeller, said generator having a terminal, a battery charging wire normally connected therewith and means for disconnecting said battery charging wire from said terminal and for also applying said brake when said manually operable means is operated.

15. In a wind driven generator structure, a support, a generator pivotally mounted thereon, means biasing said generator to remain with its axis substantially parallel to the direction of the wind, a generator shaft, a propeller on said shaft for rotating it, manually operable means for swinging said generator out of the wind in opposition to said biasing means, said generator having a terminal, a battery charging wire normally connected therewith, a brake for said propeller and means for applying said brake, disconnecting said battery charging wire from said terminal and grounding said terminal when said manually operable means is operated.

16. In a wind driven generator structure, a support, a frame member pivotally mounted on said support on a vertical axis and a generator pivotally mounted on said frame member on a second axis, a propeller on said generator, a vane secured to said frame in a vertical plane and means constraining said generator axis to remain substantially parallel to said vane whereby wind pressure against the propeller will swing said generator about said second axis, said second axis being inclined from the vertical to effect outward tipping of the lower end of the propeller when said generator is swung from position with its axis parallel to said vane.

17. In a wind driven generator structure, a frame, a generator pivotally mounted on a vertical axis on said frame, a generator shaft, a propeller on said shaft for rotating it, the pivotal mounting of said generator being inclined at a slight angle to the vertical and in a direction to effect outswinging of the lower end of the propeller when said generator is swung out of the wind.

18. In a wind driven generator structure, a support, a frame member pivotally mounted on said support on a vertical axis and a generator pivotally mounted on said frame member on a second axis, arranged at a slight angle to the vertical, a propeller on said generator, a vane secured to said frame in a vertical plane and means constraining said generator axis to remain substantially parallel to said vane whereby wind pressure against the propeller in excess of a predetermined degree will swing said generator about said second axis, the angularity of which effects tipping of said propeller out of the vertical plane.

19. In a device of the class described, a frame arranged in a vertical plane and pivoted on a vertical axis, extensions on said frame, a vane secured to one of said extensions and a generator pivoted to the other of said extensions and thereby swingable relative to said frame on a vertical axis, means biasing said generator to remain with its axis of rotation substantially parallel to the plane of said vane, a generator shaft, a propeller on the generator shaft for rotating it and for swinging the generator out of the wind against such biasing force when the wind pressure against the propeller increases above a predetermined maximum, said vane resisting pivotal movement of said frame about its vertical axis upon such increase in wind pressure.

20. In a device of the class described, a frame arranged in a vertical plane and pivoted on a vertical axis, extensions on said frame, a vane secured to one of said extensions and a generator pivoted to the other of said extensions and thereby swingable relative to said frame on a vertical axis, means biasing said generator to remain with its axis of rotation substantially parallel to the plane of said vane, a generator shaft, a propeller on the generator shaft for rotating it and for swinging the generator out of the wind against such biasing force when the wind pressure against the propeller increases above a predetermined maximum, said vane resisting pivotal movement of said frame about its vertical axis, the effect of such resistance being increased in proportion to an increase of the wind pressure.

21. In a wind driven generator structure, a frame pivotally mounted on a vertical axis, a vane for maintaining said frame in a desired position relative to the direction of the wind, a generator pivotally mounted on a vertical axis on said frame, the axis of said generator being on one side of the vertical pivotal axis of said frame and the plane of said vane being on the opposite side thereof, means biasing said generator to remain with its axis of rotation substantially parallel to the plane of said vane, a generator shaft, a propeller on said shaft for rotating it and for swinging the generator out of the wind against such biasing force when the wind pressure against the propeller increases above a predetermined maximum, said vane resisting pivotal movement of said frame about its vertical axis upon such increase in wind pressure.

22. In a wind driven generator structure, a frame pivotally mounted on a vertical axis, a vane for maintaining said frame in a desired position relative to the direction of the wind, a generator pivotally mounted on a vertical axis on said frame, the axis of said generator being on one side of the vertical pivotal axis of said frame, means biasing said generator to remain with its axis of rotation substantially parallel to said plane of said vane, a generator, a propeller on said shaft for rotating it and for swinging the generator out of the wind against such biasing force when the wind pressure against the propeller increases above a predetermined maximum, said vane resisting pivotal movement of said frame about its vertical axis upon such increase in wind pressure.

23. In a device of the class described, a vertical post, a frame pivoted thereon, a generator pivoted on a vertical axis to said frame, a generator shaft, a propeller on said shaft, the axis of said generator being offset relative to the axis of the pivot mounting of the generator to the frame, a vane on said frame and in a plane offset from the plane of the axis of the generator, said vane resisting pivotal movement of said frame relative to said post to prevent swinging of said vane out of the wind upon excess wind pressure tending to swing the generator out of the wind.

24. In a device of the class described, a support, a frame pivoted thereon, a generator pivoted to said frame, a generator shaft, a propeller on said shaft, the axis of said generator being offset relative to the axis of the pivot mounting of the generator to the frame, a vane on said frame, said vane resisting pivotal movement of said frame relative to said support to prevent swinging of said vane out of the wind upon excess wind pressure tending to swing the generator out of the wind.

25. In a device of the class described, a frame pivoted on a vertical axis, a vane secured to said frame, a generator pivoted to said frame and swingable relative thereto on a vertical axis, means biasing said generator to remain with its axis of rotation substantially parallel to the plane of said vane, a generator shaft, a propeller on said shaft for rotating it and for swinging the generator out of the wind against such biasing force when the wind pressure against the propeller increases above a predetermined maximum, said vane resisting pivotal movement of said frame about its vertical axis upon such increase in wind pressure.

26. In a device of the class described, a frame pivoted on a vertical axis, a vane secured to said frame, a generator pivoted to said frame on a vertical axis, means biasing said generator to remain with its axis of rotation substantially parallel to the plane of said vane, a generator shaft, a propeller on said generator shaft for rotating it and for swinging the generator out of the wind against such biasing force when the wind pressure against the propeller increases above a predetermined maximum, said vane resisting pivotal movement of said frame about its vertical axis, the resisting effect of said vane being increased in proportion to an increase of the wind pressure above said predetermined maximum.

27. In a wind driven generator structure, a frame pivotally mounted, a generator pivotally mounted on a vertical axis on said frame, means biasing said generator to remain in a predetermined position relative to said frame, a generator shaft, a propeller on the generator shaft for rotating it and for swinging the generator out of the wind against such biasing force when the wind pressure against the propeller exceeds a predetermined maximum, said vane resisting pivotal movement of said frame, the effect of such resistance being increased in proportion to the degree to which said generator is swung out of the wind.

28. In a device of the class described, a vertical post, a frame pivoted thereon, a generator pivoted on a vertical axis to said frame, a generator shaft, a propeller on said shaft, the axis of said generator being offset relative to the axis of the pivot mounting of the generator to the frame, a vane on said frame and in a plane offset from the plane of the axis of the generator to thereby resist pivotal movement of said frame relative to said post, to prevent swinging of said vane out of the wind, upon excess wind pressure tending to swing the generator out of the wind.

29. In a mechanical wind driven device, a support, a frame member and a pivotal mounting for securing said frame member to the support, a rotatable driven member and a second pivotal mounting for securing said driven member to the frame, said second pivotal mounting being adapted to lie in a plane normally parallel to and separated from the plane of said first pivotal mounting.

ELMER K. MALME.